United States Patent [19]

Gustafson

[11] Patent Number: 4,709,884
[45] Date of Patent: Dec. 1, 1987

[54] PARACHUTE APPARATUS FOR MODEL AIRPLANE

[76] Inventor: Troy C. Gustafson, 9913 Dellridge Rd., Bloomington, Minn. 55420

[21] Appl. No.: 4,027

[22] Filed: Jan. 16, 1987

[51] Int. Cl.⁴ .......................................... B64D 17/72
[52] U.S. Cl. .................................... 244/139; 446/50
[58] Field of Search ............. 244/138 R, 139; 446/50, 446/51, 53

[56] References Cited

U.S. PATENT DOCUMENTS

| | | | |
|---|---|---|---|
| 1,019,858 | 3/1912 | Tanner . | |
| 1,037,749 | 9/1912 | Feall . | |
| 1,103,233 | 7/1914 | Waight . | |
| 1,303,976 | 5/1919 | Smith . | |
| 1,465,835 | 8/1923 | Atkinson | 244/139 |
| 1,666,456 | 4/1928 | Porte | 244/139 |
| 2,673,051 | 3/1954 | Frost | 255/139 |
| 3,138,348 | 6/1964 | Stahmer | 244/17.15 |
| 3,463,425 | 8/1969 | Hibi | 244/139 |
| 3,700,192 | 10/1972 | Pleasants et al. | 244/139 |
| 4,113,208 | 9/1978 | Manfredi | 244/139 |

Primary Examiner—Joseph F. Peters, Jr.
Assistant Examiner—Rodney Corl
Attorney, Agent, or Firm—Leo Gregory

[57] ABSTRACT

A parachute for a powered model airplane in which the parachute is ejected downwardly by an ejection cartridge which may be installed for ejection of the parachute after the parachute is packed into its container in the airplane, and just prior to the take off of the airplane.

7 Claims, 6 Drawing Figures

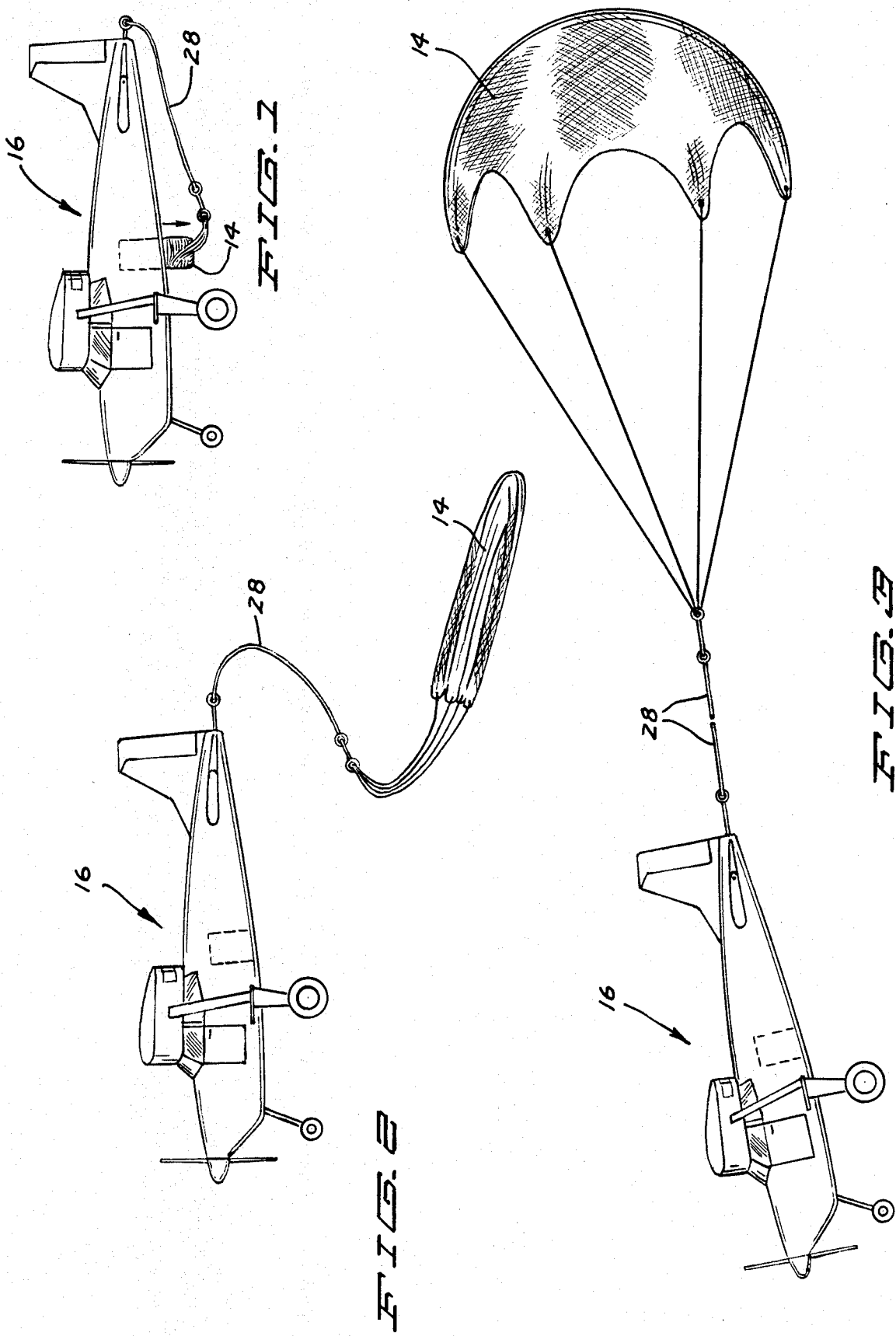

PARACHUTE APPARATUS FOR MODEL AIRPLANE

BACKGROUND OF THE INVENTION

1. Field of Invention

This invention relates to the use of parachutes with model airplanes.

2. Brief Description of the Prior Art.

The use of a parachute with a model airplane represents a very active art.

It is known to preload airplanes with parachutes which may be ejected by remote control.

It appears to be a common practice in loading parachutes in model airplanes to have the parachutes ejected upwardly and to have the ejection cartridge or explosive ejection material preloaded at the bottom of the parachute whereby the ejection cartridge or other explosive material used is placed in operating position prior to the packing of the parachute into the airplane after which there may be considerable handling of the airplane prior to its takeoff.

It is convenient to have the airplane preloaded with the parachute. However, there is an inherent danger present in having on board the airplane for any length of time the explosive material used for ejecting the parachute.

It is desirable for safety purposes to delay loading the airplane with the parachute ejecting cartridge until just prior to the takeoff time for the airplane.

SUMMARY OF THE INVENTION

This invention relates to improvement in the installation of an ejection cartridge in connection with a parachute and in the ejection of the parachute from a model airplane.

It is a purpose of this invention to have such an arrangement that a model airplane may be preloaded with a parachute separately from and prior to being loaded with an ejection cartridge.

More particularly, it is another object of this invention to provide an arrangement whereby an open bottom container is inserted into the fuselage of a model airplane through the bottom wall of the fuselage and the top of the container is adapted to hold an ejection cartridge and is reachable through a hatch in the top wall of the fuselage whereby an ejection cartridge may be readily installed just prior to the take off time for the airplane.

Thus, in view of the preceding object, a model airplane is made to be free from the hazard of being loaded with an explosive ejection cartridge until immediatley before its takeoff.

These and other objects and advantages of the invention will be set forth in the following description made in connection with the accompanying drawings in which like reference characters refer to similar parts throughout the several views.

BRIEF DESCRIPTION OF THE DRAWINGS

FIG. 1 is a view in side elevation of a model airplane showing a container for a parachute in dotted line and showing a parachute partially ejected;

FIG. 2 is a view similar to that of FIG. 1 showing the parachute in a further stage of being ejected;

FIG. 3 is a view similar to that of FIG. 1 showing the parachute fully ejected and fully opened;

DESCRIPTION OF A PREFERRED EMBODIMENT

Figure 4:
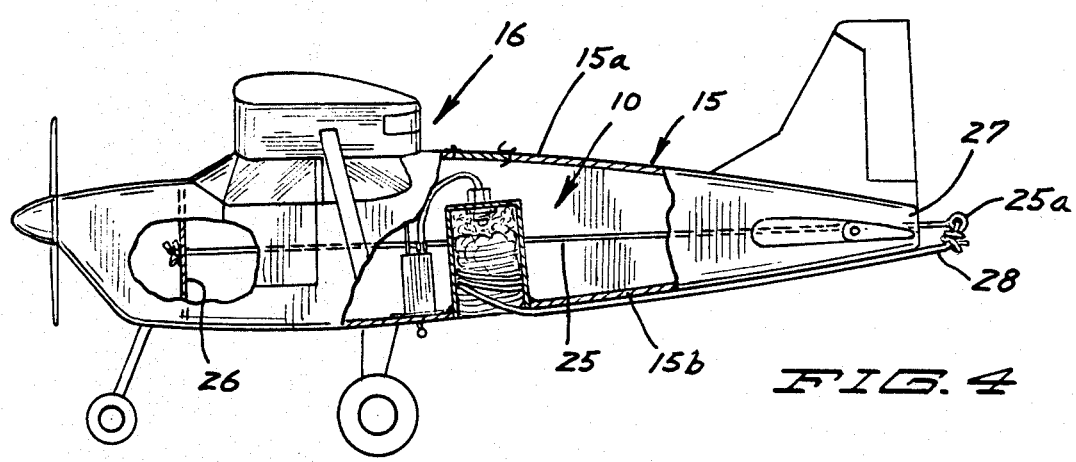
FIG. 4 is a view in partial vertical section with parts thereof broken away.
Figure 5:
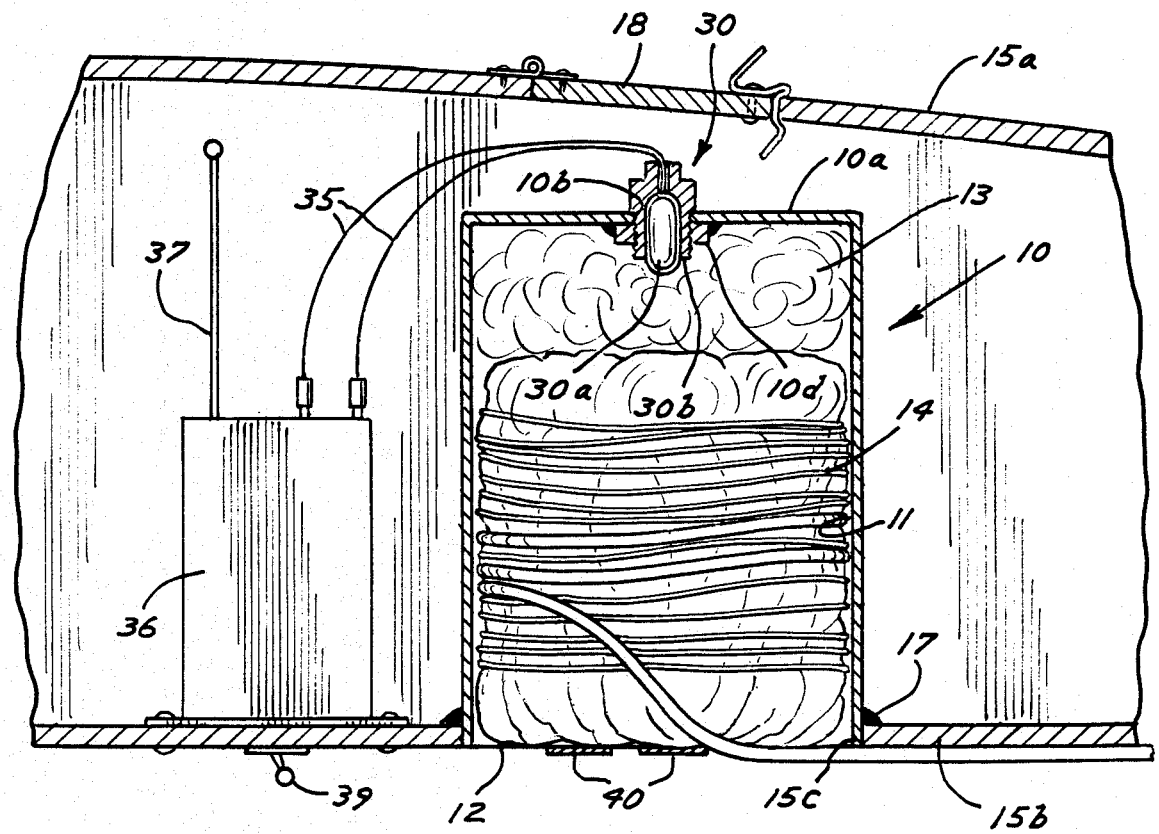
FIG. 5 is a fragmentary view in vertical section on an enlarged scale showing in detail the parachute in operating position.
Figure 6:
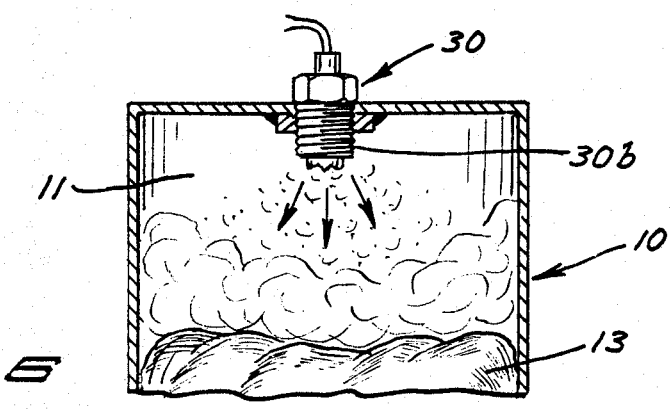
FIG. 6 is a fragmentary view in vertical section on an enlarged scale showing the upper portion of the parachute packed in its container and showing the ejection cartridge.

Referring to the drawings, the subject matter of the invention herein consists of a container 10 having a chamber 11 therein containing a parachute 14 and said container being disposed into the fuselage 15 of a model airplane 16.

The airplane is indicated as being of a conventional design and will not be further described except for reference being made to certain specific portions thereof.

A hatch 18 suitably hinged and latched is shown in the top wall 15a of said fuselage for direct access to said container.

A rod 25 is shown extending from the fire wall 26 rearwardly through the tail section 27 of said plane and a cord 28 such as a bungee cord is secured thereto at its terminal loop 25a connecting the same to said parachute 14. It will be understood that said rod 25 may be in the form of a cable and that said parachute may be anchored elsewhere than to said fire wall.

With reference to said container, the same has an open bottom 12, there being a corresponding opening 15c in the bottom wall 15b of said fuselage and the same is secured such as with an adhesive as indicated at 17.

Prior to packing said parachute 14 into said container 10, a layer of noncombustible wadding or packing material 13 is stuffed into the upper portion of said chamber 11 insulating said parachute from the ejection cartridge 30 as shown and which will be further described.

Said container 10 is indicated as being made in the form of a suitable metal container preferably cylindrical in form having a top wall 10a with a central threaded opening 10b thereinto, said opening being strengthened by an underlying boss 10d.

A conventional type of an ejection cap or cartridge 30 such as a blasting cap is utilized containing an expolsive charge 30a in a cartridge casing 30b adapted to be threaded into said opening 10b. Said cartridge is shown connected by wires 35 to a wireless receiver 36 equipped with an antenna 37 and a servo switch 39 to turn off the power pack therein when not in use. These are well known state of the art items and are deemed to require no further description.

Actuating the receiver will be a remote wireless transmitter which is not here shown and which is a commonly used device. Said transmitter will be otherwise utilized to operate the plane, putting it into flight and controlling its operation.

Retaining said parachute within said container 10 are rupturable strips of adhesive material 40 such as masking tape.

OPERATION

The plane herein will be sent aloft in the customary manner of flying powered model airplanes.

Prior to take off, the parachute will be packed into the container 10 after an insulating layer of material 13 has first been packed into the top portion of the chamber 11. The parachute is snugly packed within said container 10 and is retained by said rupturable strips 40. The cord 28 is secured to the loop 25a.

At this time the servo switch 39 is in off position and the ejection cartridge 30 has not yet been placed in the container. These are precautionary steps which prevent inadvertent premature ejection of the parachute.

When the plane is ready for takeoff, the hatch 18 is raised giving unobstructed access to the top 10a of the container 10. The ejection cartridge 30 is threaded into the opening 10b and the wires 35 are plugged into the transmitter 36. The hatch is latched. The switch 39 is placed in on position. The plane is now ready for takeoff.

When the plane is ready for landing, the operator by means of his transmitter will cause the receiver 36 to energize the ejection cartridge 30 and explode the blasting charge 30a which in turn will cause the ejection of the parachute 14 downwardly of the airplane as illustrated.

There are two particularly significant advantages in having the parachute ejected from the bottom wall of the fuselage. There is no oppportunity for the parachute to become entangled with any part of the airplane and as an important precautionary step, by means of the hatch, it is possible to load the ejection cartridge into the container at the last moment before takeoff, reducing considerably the chance of a premature ejection of the parachute by inadvertent handling of the transmitter. It is noted that in the prior art devices, of which there is knowledge, the ejection charges were first loaded into the containers of the parachutes, then the parachutes were packed. The airplane may be handled considerably prior to takeoff making opportunity for the inadvertent firing of the ejection cartridge.

In the event of a possible accidental ejection of the parachute while grounded, there would be no particular harm caused as the parachute would merely strike the ground. There would be no upward thrust of the parachute.

Thus it is seen that there is provided a simple and safe arrangement for the use of a parachute in connection with a model airplane.

It will of course be understood that various changes may be made in form, details, arrangement and proportions of the parts without departing from the scope of the invention herein which, generally stated, consists in an apparatus capable or carrying out the objects above set forth, in the parts and combinations of parts disclosed and defined in the appended claims.

What is claimed is:

1. An apparatus controlling the descent of an airborne model airplane, having in combination
   an opening in the bottom wall of the fuselage of a model airplane,
   a container disposed into said opening,
   said container having an open bottom,
   a parachute packed into said container through said opening,
   means connecting said parachute and said airplane,
   a hatch in the top wall of said fuselage for access to the top wall of said container,
   a parachute ejecting cartridge,
   means positioning said cartridge into said top wall of said container, and
   means activating said cartridge to eject said parachute downwardly of said airplane.

2. The structure of claim 1, wherein
   said parachute connecting means comprises an attachment extending from the fire wall of said airplane through the tail section thereof having a terminal portion outwardly of said tail section and
   flexible means connecting said parachute with said terminal portion.

3. The structure of claim 1, wherein
   said top wall of said container has a threaded aparture therein, and
   said ejection cartridge has a casing threaded to be received within said threaded aperture.

4. The structure of claim 1, including
   noncombustible packing disposed between said parachute and said ejection cartridge in said container.

5. The structure of claim 1, wherein
   said connecting means comprises a cord running to the tail section of said airplane.

6. The structure of claim 1, including
   means securing said container within said opening of said fuselage.

7. The structure of claim 1, including
   rupturable means retaining said parachute within said container.

* * * * *